(12) United States Patent
Nayak et al.

(10) Patent No.: US 12,281,617 B2
(45) Date of Patent: Apr. 22, 2025

(54) AIR TURBINE STARTER WITH LUBRICATION RECIRCULATION CIRCUIT

(71) Applicant: GENERAL ELECTRIC COMPANY, Schenectady, NY (US)

(72) Inventors: Subrata Nayak, Bengaluru (IN); Milind Chandrakant Dhabade, Bengaluru (IN); Narendra Dev Mahadevaiah, Bengaluru (IN); Sharad Pundlik Pati, Bengaluru (IN); Shiloh Montegomery Meyers, Miamisburg, OH (US); David Allan Dranschak, Union, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/581,993

(22) Filed: Feb. 20, 2024

(65) Prior Publication Data
US 2024/0240591 A1 Jul. 18, 2024

Related U.S. Application Data

(63) Continuation of application No. 17/946,238, filed on Sep. 16, 2022.

(30) Foreign Application Priority Data

Jul. 12, 2022 (IN) .............................. 202211039930

(51) Int. Cl.
*F02C 7/277* (2006.01)
*F01D 25/18* (2006.01)
(Continued)

(52) U.S. Cl.
CPC .............. *F02C 7/277* (2013.01); *F01D 25/18* (2013.01); *F02C 7/32* (2013.01); *F16H 57/02* (2013.01);
(Continued)

(58) Field of Classification Search
CPC .... F02C 7/06; F02C 7/277; F02C 7/32; F01D 25/18; F16H 57/02; F16H 57/04;
(Continued)

(56) References Cited

U.S. PATENT DOCUMENTS 3,626,693 A * 12/1971 Guillot ................. G05D 16/163
415/111
4,605,039 A * 8/1986 Johnson .................. F16K 17/30
137/460

(Continued)

FOREIGN PATENT DOCUMENTS

JP 2017504752 A 2/2017
KR 102255948 B1 5/2021

*Primary Examiner* — David P. Olynick
(74) *Attorney, Agent, or Firm* — McGarry Bair PC

(57) ABSTRACT

An air turbine starter (ATS) for a gas turbine engine having an accessory gear box (AGB) with a lubricant reservoir, the air turbine starter comprising a housing at least partially defining a working air flow path; a turbine section comprising a turbine having an output shaft and a plurality of blades circumferential spaced about the output shaft and at least partially extending into the working air flow path; a drive section having a drive shaft operably coupled to the output shaft to engage the AGB; and a lubrication recirculation circuit fluidly coupled to the lubricant reservoir.

20 Claims, 10 Drawing Sheets

(51) Int. Cl.
*F02C 7/32* (2006.01)
*F16H 57/02* (2012.01)
*F16H 57/04* (2010.01)

(52) U.S. Cl.
CPC .......... *F16H 57/04* (2013.01); *F05D 2260/85* (2013.01); *F16H 2057/02017* (2013.01)

(58) Field of Classification Search
CPC ....... F16H 2057/02017; F05D 2260/98; F05D 2260/85; F16K 17/044; F16K 17/30; F16K 15/18
See application file for complete search history.

(56) References Cited

U.S. PATENT DOCUMENTS

| | | | | |
|---|---|---|---|---|
| 4,929,148 | A * | 5/1990 | Nutter | F01D 21/16 |
| | | | | 415/36 |
| 5,237,815 | A * | 8/1993 | McArthur | F02N 7/00 |
| | | | | 60/627 |
| 6,058,694 | A * | 5/2000 | Ackerman | F16N 29/02 |
| | | | | 60/39.08 |
| 6,357,922 | B1 * | 3/2002 | Harbottle | F16C 19/163 |
| | | | | 384/468 |
| 6,681,579 | B2 * | 1/2004 | Lane | F02C 7/277 |
| | | | | 60/788 |
| 7,014,419 | B2 | 3/2006 | Farnsworth et al. | |
| 7,033,134 | B2 | 4/2006 | Bristol et al. | |
| 8,910,463 | B2 | 12/2014 | Telakowski | |
| 9,194,295 | B2 * | 11/2015 | Slayter | B60R 17/02 |
| 9,752,508 | B2 * | 9/2017 | Geck | A61F 2/1613 |
| 10,247,105 | B2 | 4/2019 | Slayter et al. | |
| 10,316,756 | B2 | 6/2019 | Gentile et al. | |
| 10,519,866 | B2 | 12/2019 | Nayak | |
| 2006/0207834 | A1 | 9/2006 | Giesler et al. | |
| 2014/0250914 | A1 | 9/2014 | Slayter et al. | |
| 2014/0373939 | A1 * | 12/2014 | Borlon | F16K 15/18 |
| | | | | 137/215 |
| 2015/0082805 | A1 | 3/2015 | Zeiner et al. | |
| 2015/0292414 | A1 * | 10/2015 | Geck | F02C 7/27 |
| | | | | 137/599.11 |
| 2017/0198641 | A1 * | 7/2017 | Slayter | F02C 7/277 |
| 2018/0195437 | A1 | 7/2018 | Stephan | |
| 2019/0032567 | A1 | 1/2019 | Martinez et al. | |
| 2021/0324952 | A1 | 10/2021 | Karpik et al. | |
| 2024/0018909 | A1 * | 1/2024 | Dev Mahadevaiah | F02C 7/06 |
| 2024/0240591 | A1 * | 7/2024 | Nayak | F01D 25/18 |

* cited by examiner

AIR TURBINE STARTER WITH LUBRICATION RECIRCULATION CIRCUIT

CROSS REFERENCE TO RELATED APPLICATION

This application claims priority to and the benefit of U.S. patent application Ser. No. 17/946,238, filed Sep. 16, 2022, presently allowed, which claims priority to and the benefit of IN patent application Ser. No. 202211039930 filed Jul. 12, 2022, both of which are incorporated by reference herein in their entirety.

TECHNICAL FIELD

The present subject matter relates generally to an air turbine starter, and more specifically to lubricant distribution within the air turbine starter.

BACKGROUND

An aircraft engine, for example a gas turbine engine, is engaged in regular operation to an air turbine starter. The internal components of the air turbine starter require lubrication. The supply of lubricant, such as oil, to the air turbine starter can be self-contained or provided from the accessory gear box.

DETAILED DESCRIPTION

Figure 1:
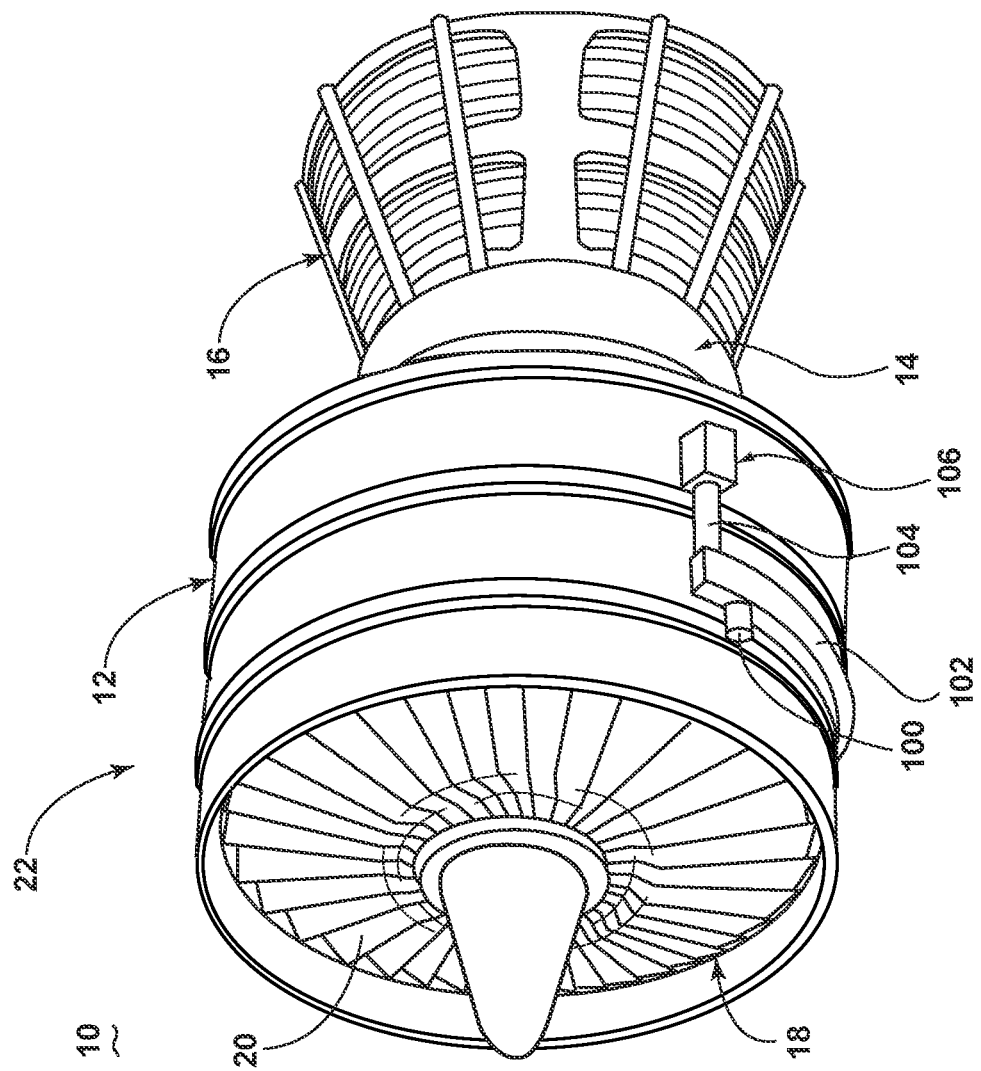
FIG. 1 is a schematic illustration of a gas turbine engine with an air turbine starter in accordance with various aspects described herein.

The present disclosure is related to a lubrication recirculation circuit in an air turbine starter. In one non-limiting example the lubrication recirculation circuit includes an accessory gear box (AGB) and an air turbine starter (ATS) where lubrication, in some cases oil, is shared between the two. The lubrication recirculation circuit can operate under different operating conditions and can include a bypass to the AGB. The starter can have various applications including starting a gas turbine engine and generating electrical power when the gas turbine engine is in operation. While the exemplary embodiment described herein is directed to a starter and AGB, embodiments of the disclosure can be applied to any implementation of a lubrication recirculation circuit shared between two engine components.

The word "exemplary" may be used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" may be used herein to refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" may be used herein to refer to a direction that is opposite the lubricant flow direction, and the term "downstream" refers to a direction that is in the same direction as the lubricant flow. The term "fore" or "forward" means in front of something and "aft" or "rearward" means behind something. For example, when used in terms of lubricant flow, fore/forward can mean upstream and aft/rearward can mean downstream. These terms may also be used to describe relative location.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only the dimensions, positions, order and relative sizes reflected in the drawings attached hereto can vary.

The singular forms "a", "an", and "the" include plural references unless the context clearly dictates otherwise.

Furthermore, as used herein, the term "set" or a "set" of elements can be any number of elements, including only one.

Approximating language, may be used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or circuits. In at least some instances, the approximating language may correspond to the precision of an instrument for measuring the value, or the precision of the methods or machines for constructing or manufacturing the components and/or circuits. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate" may be used herein is not limiting, rather a descriptor for locating parts described herein. Further, the term "proximate" means nearer or closer to the part recited than the following part. For example, where a first hole and a second hole are located at a distance from a wall, where the first hole is proximate the wall, the first hole is closer to the wall than the second hole.

Referring to FIG. 1, a gas turbine engine 10 having a compressor section 12, a combustion section 14, and a turbine section 16 is illustrated. An air intake 18 defined by a fan 20 supplies air to the compressor section 12 of the engine 10. The air intake 18 and the compressor section 12 are collectively known as the 'cold section' 22 of the gas turbine engine 10 located upstream from the combustion section 14. The compressor section 12 provides the combustion section 14 with high-pressure air. The high-pressure air is mixed with fuel and combusted in a combustion chamber (not shown) in the combustion section 14 to form hot and pressurized combusted gasses. The hot and pressurized combusted gasses pass through the turbine section 16 before exhausting from the gas turbine engine 10. As the pressurized gasses pass through a high-pressure turbine (not shown) and a low-pressure turbine (not shown) of the turbine section 16, the turbines extract rotational energy from the flow of the gases passing through the gas turbine engine 10. The compressor section 12 and the turbine section 16 can be coupled to each other by way of a shaft to power the compressor section 12. The low-pressure turbine can be coupled to the fan 20 of the air intake 18 by way of a shaft to power the fan 20.

The gas turbine engine 10 can be a turbofan engine commonly used in modern commercial and military aviation or it could be a variety of other known gas turbine engines such as a turboprop or turboshaft. The gas turbine engine 10 can also have an afterburner that burns an additional amount of fuel downstream from the turbine section 16 to increase the velocity of the exhausted gases, and thereby increasing thrust.

A starter motor or an air turbine starter (ATS) 100 can be drivingly coupled to the gas turbine engine via an accessory gear box (AGB) 102, also known as a transmission housing, schematically illustrated as being mounted to the gas turbine engine 10. A horizontal drive shaft 104 can extend from the AGB 102 to a transfer gear box 106. The AGB 102 can be coupled to a turbine shaft within the gas turbine engine 10, either to the low-pressure or high-pressure turbine by way of a radial drive shaft (not shown) extending from the transfer gear box 106 into the gas turbine engine 10.

Figure 2:
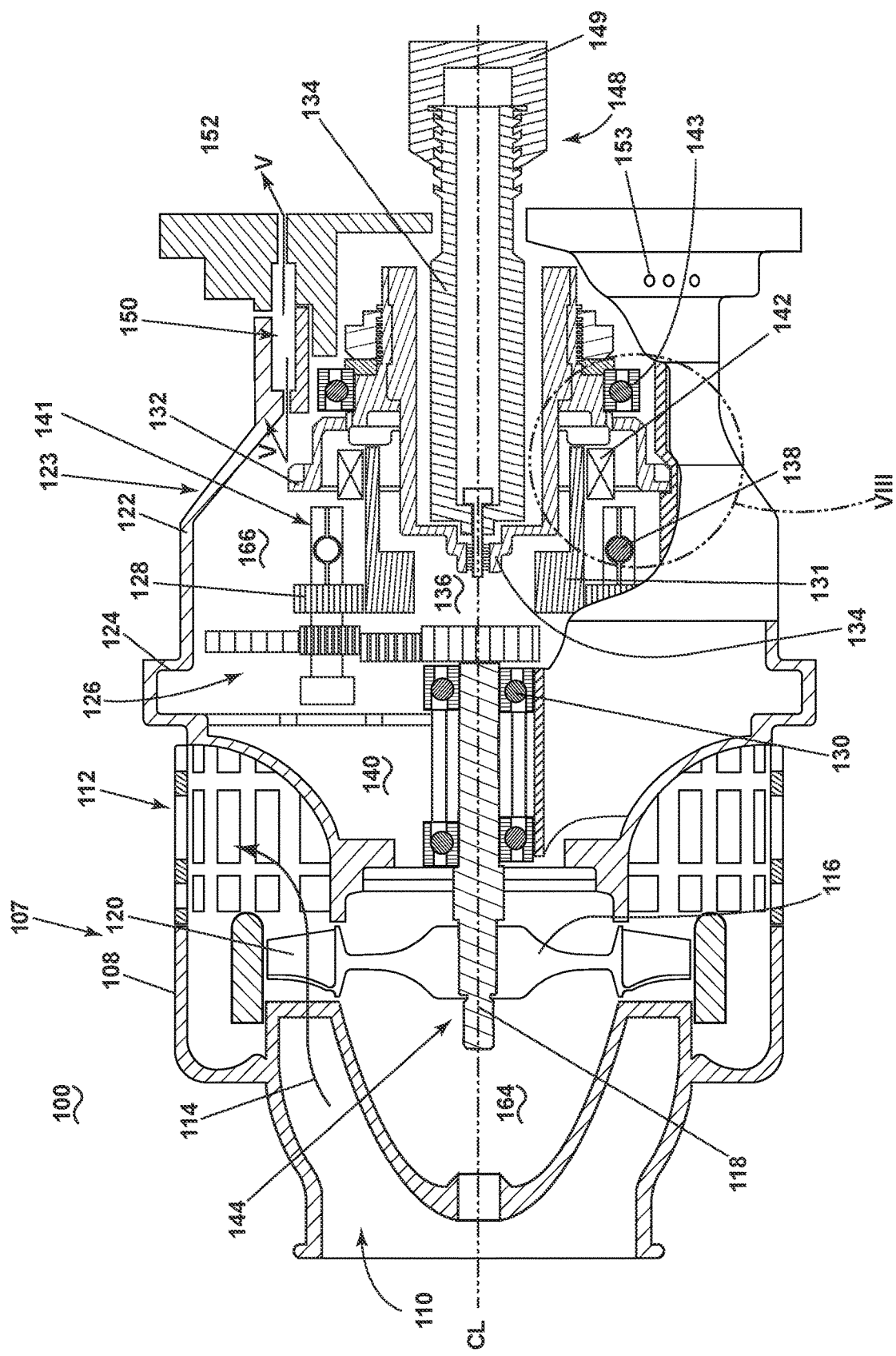
FIG. 2 is a sectional view of the air turbine starter with a lubrication recirculation circuit according to various aspects described herein.

Referring now to FIG. 2, the ATS 100 is shown in greater detail. The ATS 100 can include an ATS turbine section 107 including a turbine housing 108 defining an inlet 110 and an outlet 112 and a turbine section interior 164. A flow path 114 can extend between the inlet 110 and outlet 112 for communicating a flow of gas from the inlet 110 to the outlet 112. A turbine member 116 can include a turbine shaft 118 and a plurality of blades 120 extending from the turbine shaft 118. The turbine shaft 118 can be journaled within the turbine housing 108. The plurality of blades 120 can be disposed within the flow path 114 for rotatably extracting mechanical power from the flow of gas along the flow path 114.

A drive housing 122 can define a drive section 123 with at least a portion of a gear box 124 defining a drive section interior 166. A gear train 126 can be disposed within the gear box 124 and be drivingly coupled with the turbine shaft 118. The gear train 126 can include a ring gear 128 and can further comprise any gear assembly including for example but not limited to a planetary gear assembly or a pinion gear assembly. The turbine shaft 118 can be rotatably mounted to the gear train 126 allowing for the transfer of mechanical power from the turbine member 116 to the gear train 126. The turbine shaft 118 can be supported by a pair of turbine bearings 130.

A carrier member 131 can be drivingly coupled with the gear train 126. A driven member 132 can include a drive shaft 134 and be rotatably mounted to the carrier member 131. An aperture 136 in the carrier member 131 can receive the drive shaft 134. The carrier member 131 can be supported by carrier bearings 138.

The turbine section interior 164 and the drive section interior 166 together define a housing interior 140. The housing interior 140 can contain lubricant, by way of non-limiting example oil, to provide lubrication and cooling to at least one lubricated component 141, i.e. mechanical parts contained within such as the gear train 126, ring gear 128, and bearings 130, 138.

A clutch 142 can be mounted to the carrier member 131. The driven member 132 is coupled to the clutch 142 and additionally supported by drive bearings 143. The driven member 132 is driven by the carrier member 131 which in turn is driven by the gear train 126 which in turn is driven by the turbine member 116. The clutch 142 can be any type of shaft interface portion that forms a single rotatable shaft 144 comprising the turbine member 116, the carrier member 131, and the driven member 132. The shaft interface portion can be by any known method of coupling including, but not limited to, gears, splines, a clutch mechanism, or combinations thereof.

A decoupler assembly 148 can be disposed within at least a portion of the driven member 132. An output shaft 149 can be mounted to the drive shaft 134. The output shaft 149 can be operably coupled to the AGB 102 which in turn is operably coupled to the engine 10.

A lubrication recirculation circuit (LRC) 150 can be at least partially disposed within the drive housing 122. The LRC 150 can include a lubrication line 152 extending between the AGB 102 and the housing interior 140. The LRC 150 can further include a set of AGB outlets 153 fluidly coupled to the housing interior 140. After passing through the LRC 150, the set of AGB outlets 153 provide an exit for lubricant from the ATS 100 to the AGB 102.

The turbine housing 108 and the drive housing 122 can be formed by any known materials and methods, including, but not limited to, die-casting of high strength and lightweight metals such as aluminum, stainless steel, iron, or titanium. The turbine housing 108 and the drive housing 122 defining the ATS 100 can be formed with a thickness sufficient to provide adequate mechanical rigidity without adding unnecessary weight to the full assembly and, therefore, the aircraft.

The rotatable shaft 144 can be constructed by any known materials and methods, including, but not limited to extrusion or machining of high strength metal alloys such as those containing aluminum, iron, nickel, chromium, titanium, tungsten, vanadium, or molybdenum. The diameter of the turbine shaft 118 and drive shaft 134 along with any other shafts defining the rotatable shaft 144 can be fixed or vary along the length of the rotatable shaft 144. The diameter can vary to accommodate different sizes, as well as rotor to stator spacings.

During operation air is introduced into the inlet 110, travels along the flow path 114 causing the rotation of the turbine member 116. This rotation enables the passing along of mechanical energy through the rotatable shaft 144 to the AGB 102 and in turn to the engine 10 via the transfer gear box 106 (FIG. 1). Upon starting the engine 10, the clutch 142 can disconnect the drive shaft 134 from the carrier member 131. In the event of a backdrive, the ATS 100 should be disconnected from the AGB 102. The decoupler assembly 148 enables a disconnection from the AGB 102.

Figure 3:
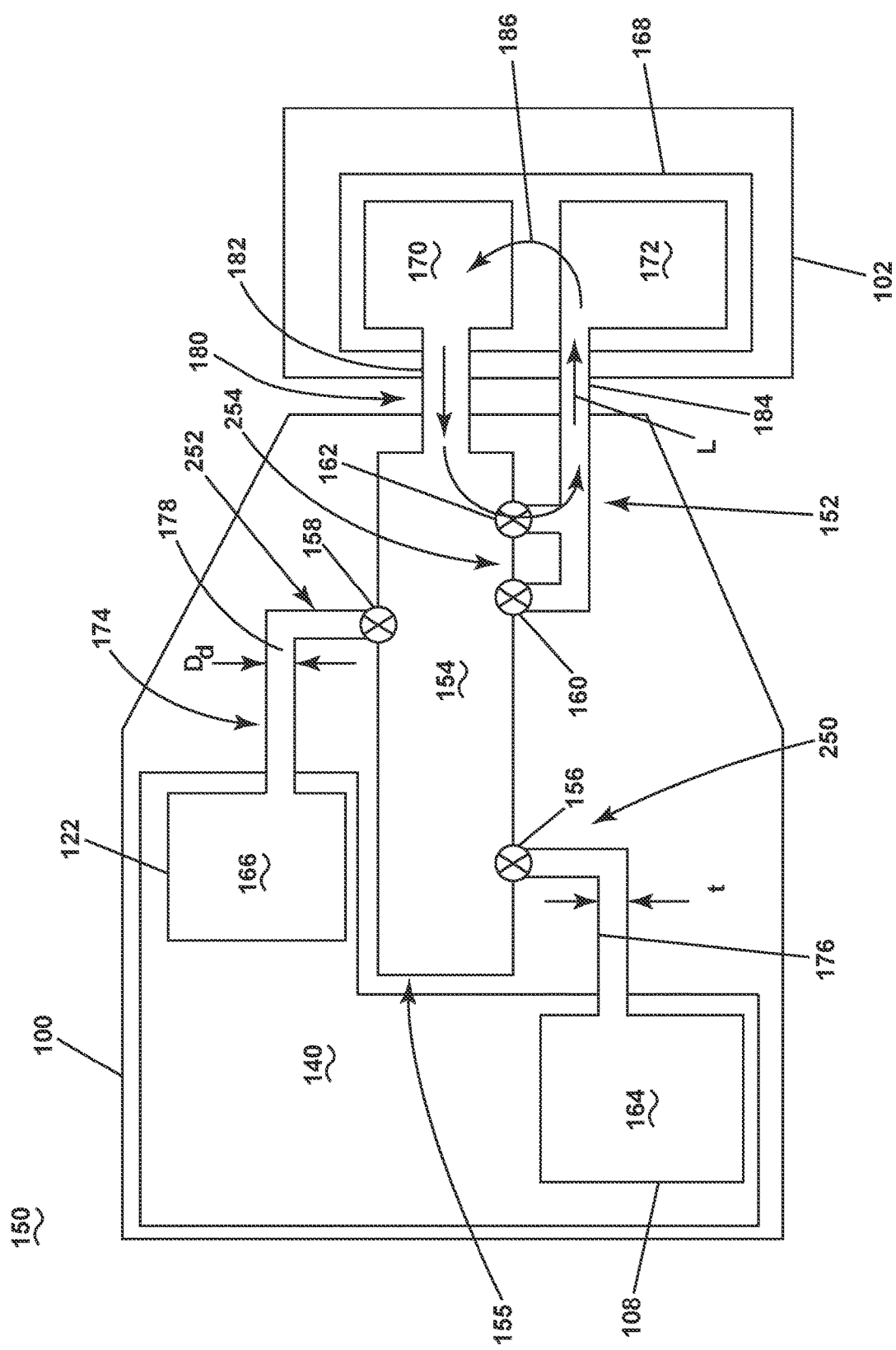
FIG. 3 is a schematic of a lubrication recirculation circuit for the air turbine starter of FIG. 2 according to an aspect of the disclosure herein.

FIG. 3 is a schematic illustrating the LRC 150 according to an aspect of the disclosure herein. A valve 155 for controlling the passage of lubricant along the lubrication line 152 between the AGB 102 and the ATS 100 can be disposed within the ATS 100. A distribution chamber 154 can define at least a portion of the lubrication line 152. In one non-limiting example the valve 155 is a multiplex control valve having a first inlet 156 and a second inlet 158 for distributing lubricant and a first return outlet 160 and a second return outlet 162 for re-directing lubricant.

The housing interior 140 can be further divided into the turbine section interior 164 and the drive section interior 166. The turbine section interior 164 can be at least partially defined by the turbine housing 108 while the drive section interior 166 can be at least partially defined by the drive housing 122. The AGB 102 can include a lubricant reservoir 168. The lubricant reservoir 168 can be one reservoir, or be divided into multiple reservoirs as illustrated, by way of non-limiting example an oil supply 170 and an oil storage 172.

The lubrication line 152 can include a set of distribution conduits 174 extending between the distribution chamber 154 and the housing interior 140. The set of distribution conduits 174 can include a turbine conduit 176 and a drive conduit 178. The turbine conduit 176 can extend between the first inlet 156 and the turbine section interior 164. The turbine conduit 176 can define a turbine diameter (Dt). The drive conduit 178 can extend between the second inlet 158 and the drive section interior 166. The drive conduit 178 can define a drive diameter (Dd). The lubrication line 152 can further include a set of connecting conduits 180 extending between the lubricant reservoir 168 and the distribution chamber 154. The set of connecting conduits 180 can include a supply line 182 and a return line 184. The supply line 182 can extend between the oil supply 170 and the distribution chamber 154 and the return line 184 can extend between the distribution chamber 154 and the oil storage 172. The return line 184 can be fluidly coupled to the distribution chamber 154 via the first return outlet 160 or the second return outlet 162.

The valve 155 can control a passage of lubricant (L) between the lubricant reservoir 168 and the housing interior 140. More specifically, in a turbine supply position 330 (see FIG. 5), the valve 155 can allow the passage of lubricant (L) from the distribution chamber 154 to the turbine conduit 176 by opening the first inlet 156. Likewise, in a drive supply position 340 (see FIG. 6), the valve 155 can allow the passage of lubricant (L) from the distribution chamber 154 to the drive conduit 178 by opening the second inlet 158 to provide a reduced pressure flow rate to the drive section interior 166.

The valve 155 can open and close the first and second return outlets 160, 162 to control the intake of lubricant (L) into the return line 184. The first return outlet 160 can be open while in the drive supply position 340. In a bypass position 350 (see FIG. 7), the second return outlet 162 can be opened while the first and second inlets 156, 158 and the first return outlet 160 are closed such that no lubricant (L) passes into the housing interior 140. In this manner, the return line 184 can define a portion of a bypass line 186 in both the drive supply position 340 and the bypass position 350. The bypass line 186 includes the lubricant reservoir 168, the supply line 182, and the distribution chamber 154.

In one aspect of the disclosure, the valve 155 is a pressure valve that is responsive to a lubricant pressure (P). The passage of lubricant (L) through the lubrication line 152 is controlled by the lubricant pressure (P) defined as a pressure on the lubricant (L) produced by a pressure difference between the AGB 102 and the ATS 100. The lubricant pressure (P) in turn translates to a pressure on the valve 155. The lubricant pressure (P) can range between 15 psi and 50 psi (15 psi≤P≤50 psi). In some implementations the range is between 20 psi and 45 psi (20 psi<P<45 psi). At a low lubricant pressures, below 30 psi, the passage of lubricant (L) to the drive section interior 166 is closed while the passage of lubricant (L) to the turbine section interior 164 is open. At a high lubricant pressure, above 35 psi, the passage of lubricant (L) to the drive section interior 166 is open while the passage of lubricant (L) to the turbine section interior 164 is closed. For ranges between 30 psi and 35 psi, the valve 155 can be partially open for either/both the turbine conduit 176 or/and the drive conduit 178. 12.

In one aspect, higher lubricant pressure can result in a flow rate that is more than necessary. In this case, the drive diameter (Dd) of the drive conduit 178 can be formed to be smaller than the turbine diameter (Dt) to control the flow rate to the drive section interior 166. When the drive diameter is less than the turbine diameter (Dd<Dt), the bypass line 186 can be opened to provide an outlet via the first return outlet 160 for excess lubricant (L) to flow back to the lubricant reservoir 168. It should be understood that the higher lubricant pressure (above 35 psi) can cause a higher flow rate than necessary to the drive section interior 166, in which case the bypass line 186 can be opened to provide a lower flow rate, the drive diameter (Dd) can be decreased to provide a lower flow rate, or a combination of both can be done to provide a lower flow rate.

In an event where the ATS 100 develops a housing breach in one or both of the turbine housing 108 or the drive housing 122, a sudden drop in the pressure difference produces an increased lubricant pressure beyond a threshold pressure (P>50 psi). This sudden pressure increase can cause the valve 155 to close the first and second inlets 156, 158 and the first return outlet 160 and keep the second return outlet 162 open such that all lubricant (L) passes through the return line 184 back to the lubricant reservoir 168 and no lubricant (L) passes into the housing interior 140. In other words, when the pressure difference between the ATS 100 and the AGB 102 is indicative of a housing breach, the supply line 182 is closed and the bypass line 186 is open, and, when the pressure difference is indicative of normal operation of the ATS 100, the supply line 182 is open.

Figure 4:
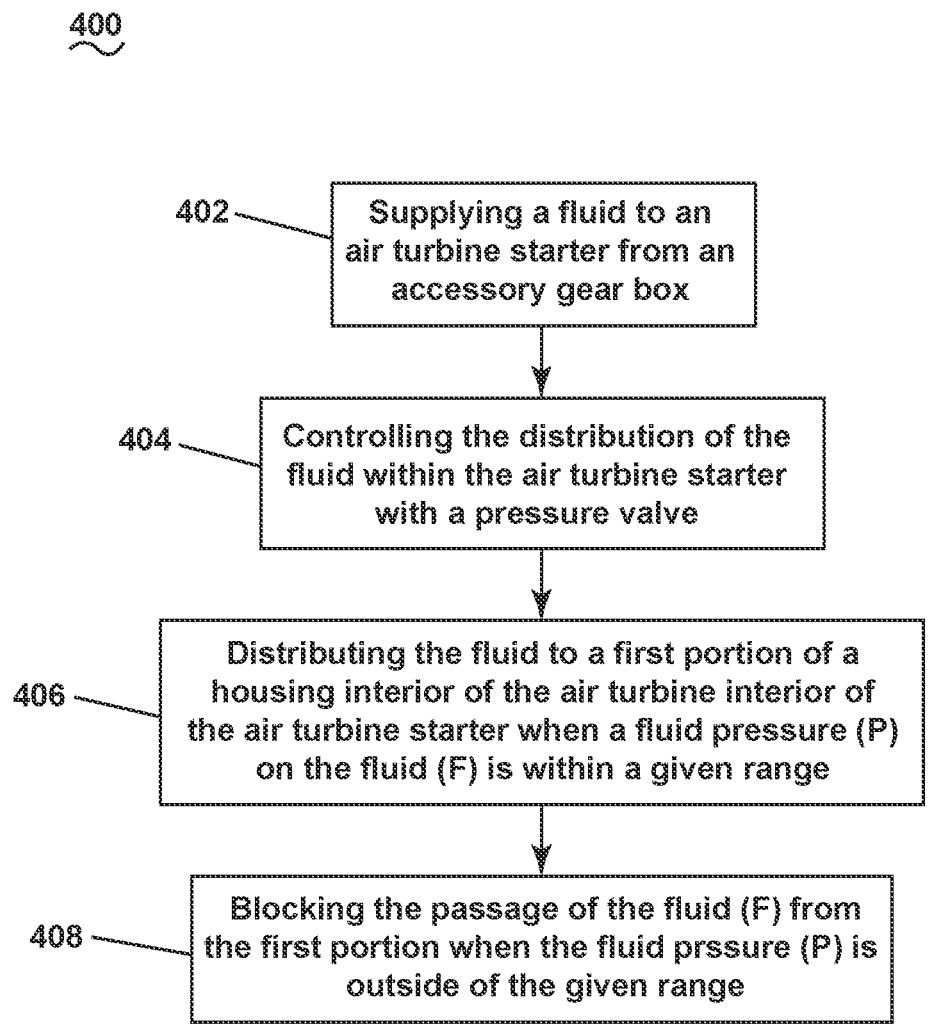
FIG. 4 is a method of supplying lubrication to the air turbine starter of FIG. 2 according to an aspect of the disclosure herein.

Turning to FIG. 4, a method 400 of supplying lubrication to an air turbine starter is illustrated in a flow chart. At a block 402, supplying the lubricant (L) to the ATS 100 from the AGB 102. At a block 404, controlling the distribution of the lubricant (L) within the ATS 100 with the valve 155. At a block 406, distributing the lubricant (L) to a first portion of the housing interior 140, by way of non-limiting example one of the turbine section interior 164 or the drive section interior 166, when the lubricant pressure (P) is within a given range. The given range can be between 20 psi and 35 psi or between 30 psi and 45 psi. Distributing the lubricant (L) can include distributing the lubricant (L) to the turbine section interior 164 when the lubricant pressure (P) is below 35 psi. Distributing the lubricant (L) can also include distributing the lubricant (L) to the drive section interior 166 when the lubricant pressure (P) is above 30 psi. Further, distributing the lubricant (L) can include distributing the lubricant (L) to the return line 184 when the lubricant pressure (P) is above 30 psi. Further, distributing the lubricant (L) can include distributing the lubricant (L) to the return line 184 when the lubricant pressure (P) is above 50 psi.

At block 408, the method 400 includes blocking the passage of lubricant (L) from the first portion of the housing interior 140 when the lubricant pressure (P) is greater than or less than the given range. Blocking the passage of lubricant (L) can include blocking the passage of lubricant (L) from the turbine section interior 164 when the lubricant pressure (P) is above 35 psi. Blocking the passage of lubricant (L) can include blocking the passage of lubricant (L) from the drive section interior 166 when the lubricant pressure (P) is below 30 psi. Blocking the passage of lubricant (L) can include blocking the passage of lubricant (L) from both the turbine section interior 164 and the drive section interior 166 when the lubricant pressure (P) is above 50 psi.

Figure 5:
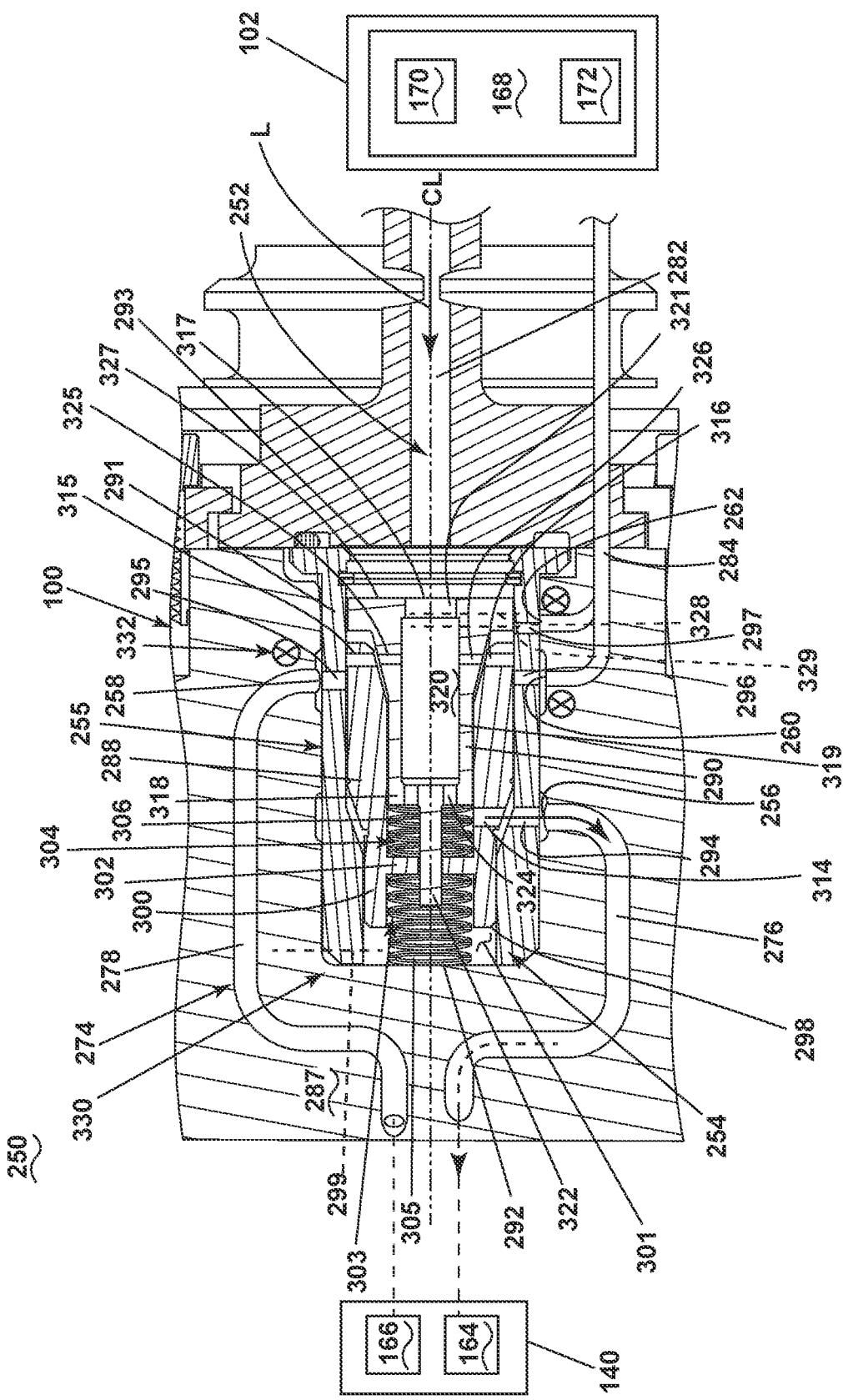
FIG. 5 is a sectional view along line V-V of FIG. 2 of a lubrication recirculation circuit for the air turbine starter with a valve in a turbine supply position according to an aspect of the disclosure herein.

Turning to FIG. 5, a cross-section of taken along line V-V of FIG. 2 illustrates an exemplary LRC 250 according to an aspect of the disclosure herein. The LRC 250 is substantially similar to the LRC 150 already described herein, therefore, like parts will be identified with like numerals increased by 100. It should be understood that the description of the like parts of the LRC 150 applies to the LRC 250 of FIG. 5 unless otherwise noted.

A lubrication line 252 extends from right to left in FIG. 5, from the AGB 102 to the ATS 100. A distribution chamber 254 can define at least a portion of the lubrication line 252. The distribution chamber 254 can be disposed within a wall 287 of the drive housing 122 for the ATS 100. The distribution chamber 254 can house a valve, by way of non-limiting example a pressure valve 255. In one aspect, the pressure valve 255 can be a sliding multiplex control valve comprising a piston 288 and a stopper 290 disposed within a valve housing 291.

The lubrication line 252 can include a set of distribution conduits 274 formed in the wall 287 and extending from the distribution chamber 254 to fluidly couple the distribution chamber 254 to a housing interior, by way of non-limiting example the housing interior 140 (FIG. 3). The set of distribution conduits 274 can include a turbine conduit 276 and a drive conduit 278. The turbine conduit 276 can be fluidly coupled to the distribution chamber 254 at a first inlet 256. The drive conduit 278 can be fluidly coupled to the distribution chamber 254 at a second inlet 258. The lubrication line 252 can further include a set of connecting conduits 280 fluidly coupling the lubricant reservoir 168 to the distribution chamber 254. The set of connecting conduits 280 can include a supply line 282 and a return line 284. The return line 284 can be fluidly coupled to the distribution chamber 254 at a first return outlet 260 and a second return outlet 262.

The valve housing 291 can be located within the distribution chamber 254 and extend between a closed end 292 at the wall 287 and an open end 293 to define a valve centerline (CL). The open end 293 can be fluidly coupled to the supply line 282. The valve housing 291 can include a set of openings, illustrated as a plurality of openings, a first opening 294, a second opening 295, a third opening 296, and a fourth opening 297 fluidly coupled to the first and second inlets 256, 258 and the first and second return outlets 260, 262 respectively.

Figure 6:
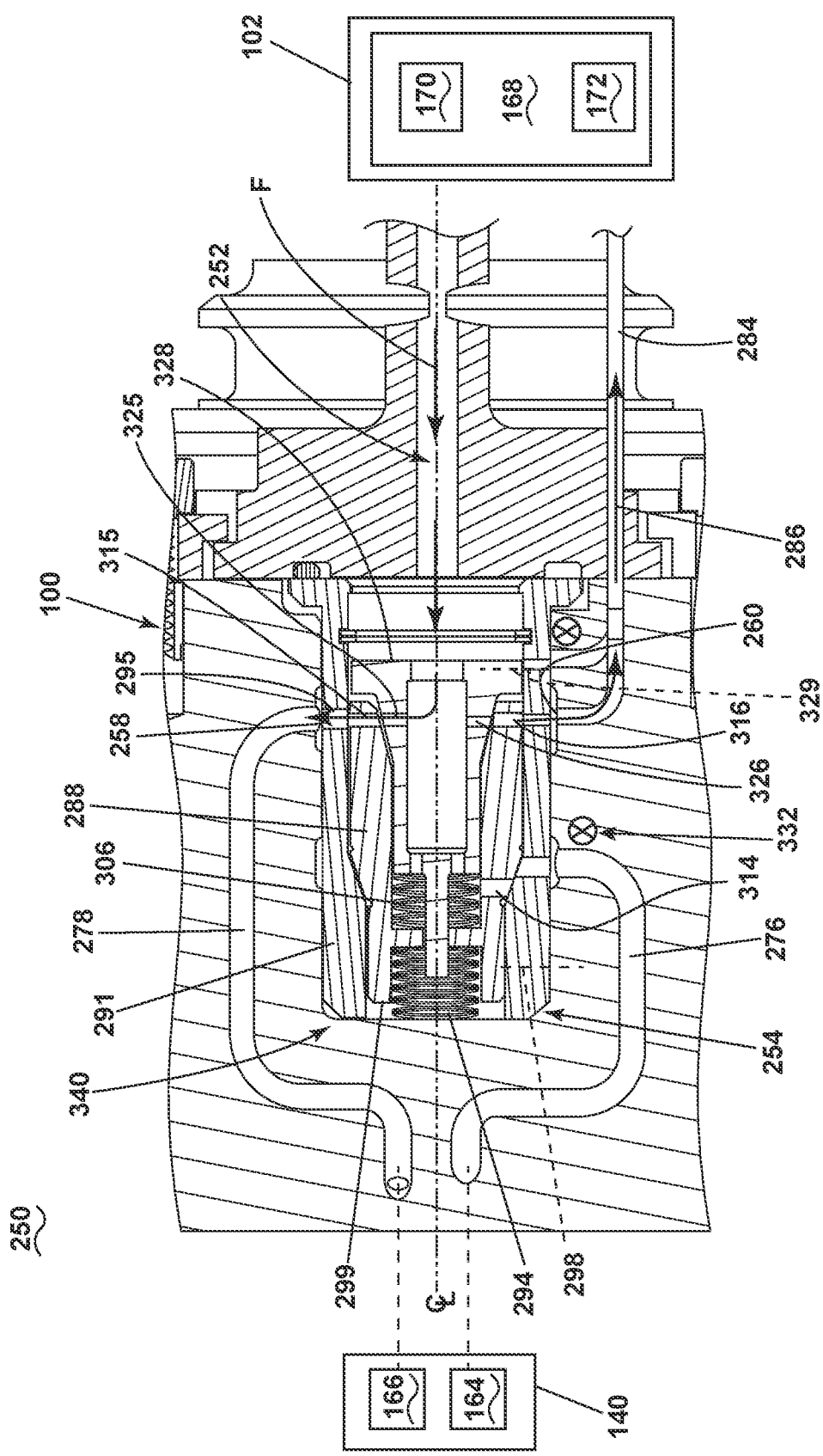
FIG. 6 is the lubrication recirculation circuit of FIG. 5 with the valve in a drive supply position according to another aspect of the disclosure herein.

The piston 288 can have a substantially cylindrical shape, be located within the valve housing 291 and be movable in an axial direction with respect to the valve centerline (CL) between a first position 298 and a second position 299 (FIG. 6). The piston 288 can include piston walls 300 defining a piston interior 301. An interior wall 302 extending substantially perpendicular to the piston walls 300 can divide the piston interior 301 into a first chamber 303 and a second chamber 304. A first spring 305 can be disposed in the first chamber 303, and a second spring 306 different than the first spring 305 can be disposed in the second chamber 304. The second spring 306 can have a higher strength, or spring constant value (k), than the first spring 305. The first spring 305 can have a strength set to enable the piston 288 to transpose between the first and second positions 298, 299.

A set of thru holes, illustrated as a plurality of thru holes, a first thru hole 314, a second thru hole 315, and a third thru hole 316 can be located within the piston walls 300. The first thru hole 314 extends through the piston wall 300 from the second chamber 304 toward the valve housing 291. The set of thru holes 314, 315, 316 can be selectively fluidly coupled to the set of openings 294, 295, 296, 297 of the valve housing 291 and the inlets 256, 258 and outlets 260, 262.

The stopper 290 can extend between a first end 317 and a second end 318. Stopper walls 319 can define a hollow portion 320 within that defines at least a portion of the lubrication line 252. The hollow portion 320 can extend between a stopper inlet 321 at the first end 317 and a first outlet 324 at the second end 318. The first outlet 324 can be fluidly coupled to the first thru hole 314 of the piston 288. The hollow portion 320 is fluidly coupled to the open end 293 of the valve housing 291 and in turn to the supply line 282 at the stopper inlet 321. A nose 322 can extend axially from the second end 318 along the valve centerline (CL) through the interior wall 302 of the piston 288. A set of side outlets, illustrated as a plurality of side outlets, a second outlet 325, and a third outlet 326 can be disposed within the stopper walls 319 to selectively fluidly couple the hollow portion 320 to the set of thru holes 314, 315, 316.

Figure 7:
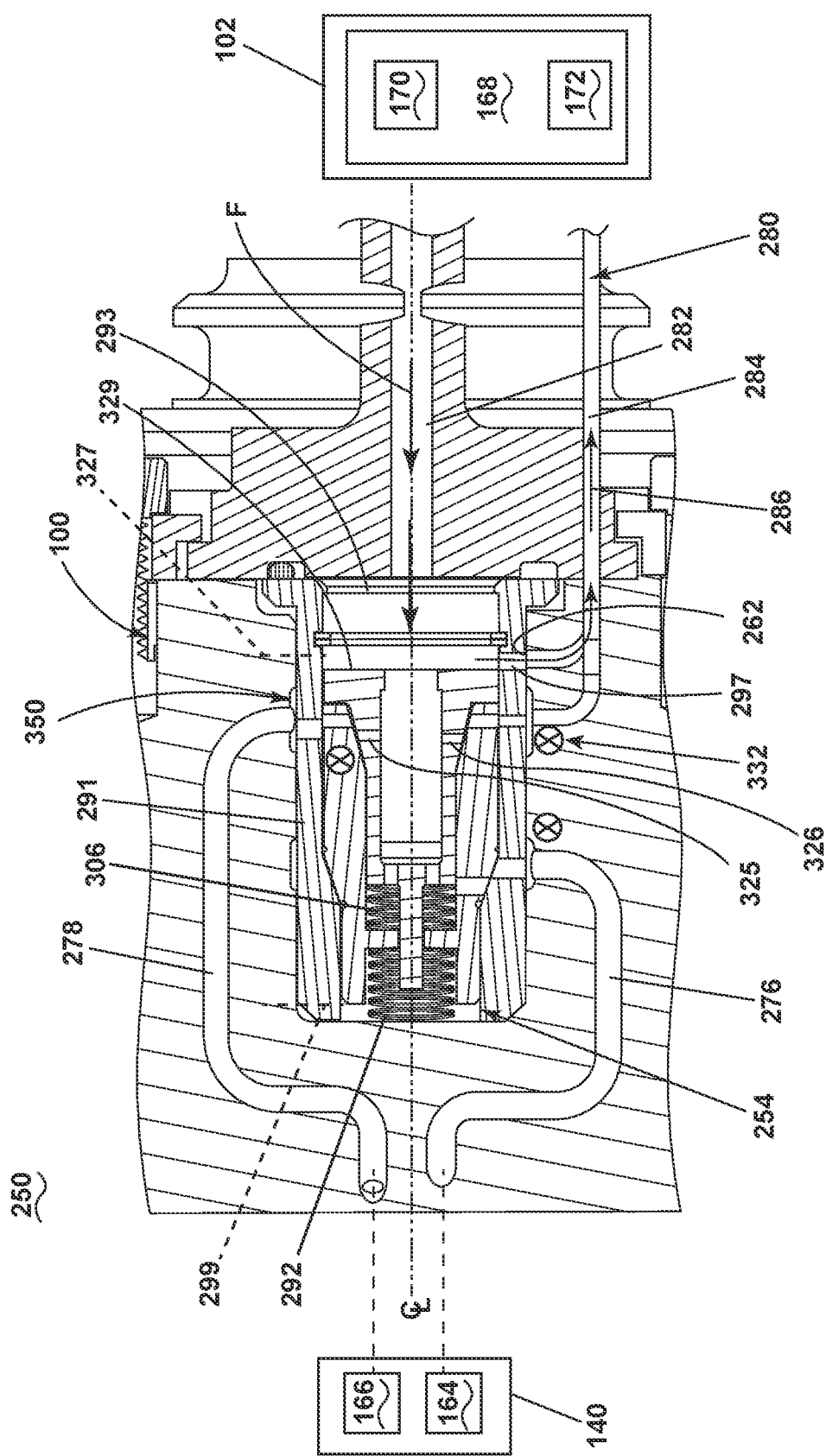
FIG. 7 is the lubrication recirculation circuit of FIG. 5 with the valve in a bypass position according to another aspect of the disclosure herein.

The stopper 290 can be movable in an axial direction with respect to the valve centerline (CL) between a third position 327, a fourth position 328 (in dashed line, FIG. 6) and a fifth position 329 (in dashed line, FIG. 7). The stopper 290 can move between the third and fourth position 327, 328 with the piston 288 when the piston 288 moves between the first and second positions 298, 299. The second spring 306 can have a strength set to enable the stopper 290 to transpose between the fourth and fifth positions 328, 329 at a certain pressure as the following describes.

A turbine supply position 330 occurs above a minimum pressure requirement and below the high lubricant pressure where a force applied to the first spring 305 and the second spring 306 by the lubricant pressure causes little to now compression of the springs 305, 306. The first thru hole 314 of the piston 288 and the first opening 294 of the valve housing 291 are aligned with the first inlet 256. In the turbine supply position 330 the piston 288 is in the first position 298 and the stopper 290 is in the third position 327 as illustrated where the lubrication line 252 extends between the lubricant reservoir 168 and the turbine section interior 164. This opens a lubricant passageway from the hollow portion 320 to the turbine conduit 276, which in turn provides the lubricant (L), by way of non-limiting example oil from the lubricant reservoir 168, in particular the oil supply 170, to the turbine section interior 164.

Distributing the lubricant (L) to the turbine section interior 164 can occur when the lubricant pressure (P) is above the minimum pressure requirement, or above 10 psi and below the high lubricant pressure of 35 psi. When the lubricant pressure (P) is between the minimum pressure requirement and the high lubricant pressure, a pushing force is applied on the first spring 305 from the interior wall 302. However, until the pressure reaches or surpasses a certain amount, by way of non-limiting example the low lubricant pressure of 30 psi, the first spring 305 compresses little to no amount at all. Therefore, below the low lubricant pressure, the piston 288, remains in the first position 298 until the pressure on the first spring 305 hits the certain amount. Between the low and high lubricant pressures, the piston 288 moves toward the second position 299 with the stopper 290 moving toward the fourth position 328 as the pressure increases and the first spring 305 spring compresses. While the first spring 305 compresses, the lubricant pressure is not high enough to compress the second spring 306. While illustrated as fully open, it should be understood that the first inlet 256 can be partially blocked as the first spring 305 moves.

In the turbine supply position 330, the second and third thru holes 315, 316 are fluidly coupled to the second and third outlets 325, 326 in the stopper 290. However, in this position, while fluidly connected to each other, the second and third thru holes 315, 316 and the second and third outlets 325, 326 are blocked by the valve housing 291, as indicated by circled x's 332, from being fluidly connected to the drive conduit 278 and the return line 284 via the second and third openings 295, 296.

Turning to FIG. 6, a drive supply position 340 is illustrated. Some numbers have been removed for clarity only, the parts are the same as those indicated in FIG. 5. Between the low lubricant pressure and a threshold pressure value, the drive supply position 340 occurs. A force is applied to the first spring 305 and the second spring 306. The force is enough to compress the first spring 305 but not the second spring 306. The compression causes the second thru hole 315 of the piston 288, the second opening 295 of the valve housing 291 and the second outlet 325 of the stopper 290 to align with the second inlet 258. In the drive supply position 340, the piston 288 is in the second position 299 and the stopper 290 has moved to the fourth position 328 with the piston 288. In the drive supply position 340, the lubrication line 252 extends between the lubricant reservoir 168 and the drive section interior 166. Further, the bypass line 186 is opened. In the drive supply position 340, and the second thru hole 315, the second opening 295, and the second outlet 325 are fluidly coupled to the second inlet 258 of the drive conduit 278. Further, in the drive supply position 340, the third thru hole 316, the third opening 296, and the third outlet 326 are aligned and fluidly coupled to the first return outlet 260 of the return line 284.

As previously described herein, distributing the lubricant (L) to the drive section interior 166 can occur when the lubricant pressure (P) is above the low lubricant pressure of 30 psi. When the lubricant pressure (P) is above 30 psi, the pressure creates a pushing force on the first spring 305 from the interior wall 302 causing the piston 288 to move into the second position 299. When the lubricant pressure (P) is above the high lubricant pressure of 35 psi, the piston 288 is fully in the second position 299. This opens a lubricant passageway from the hollow portion 320 to the drive conduit 278, which in turn provides the lubricant (L), by way of non-limiting example oil, from the lubricant reservoir 168, in particular the oil supply 170, to the drive section interior 166. Due to the high lubricant pressure, this movement also opens a lubricant passageway from the hollow portion 320 to the lubricant reservoir 168, in particular the oil storage 172, via the bypass line 186. This in combination with the smaller diameter previously described herein provides a controlled flow to the drive section interior 166.

Turning to FIG. 7, a bypass position 350 is illustrated. Some numbers have been removed for clarity only, the parts are the same as those indicated in FIG. 5. The bypass position 350 occurs at pressures at or above the threshold pressure value, or 50 psi. At this pressure the force is enough to compress the second spring 306 causing all fluid openings to both the turbine conduit 276 and the drive conduit 278 to close. The bypass position 350 is defined by when the piston 288 is in the second position 299 and the stopper 290 is in the fifth position 329. In the bypass position 350, the lubrication line 252 is defined solely by the return line 284 defining the bypass line 286 which is opened. In the bypass position 350, the fourth opening 297 that is coupled to the second return outlet 262 is open to the open end 293 of the valve housing 291. In the bypass position 350, no lubricant is provided to the housing interior 140 (FIG. 2) of the ATS 100.

As previously described herein, blocking the passage of lubricant (L) from both the turbine section interior 164 and the drive section interior 166 can occur when the lubricant pressure (P) is above the threshold pressure, or 50 psi. When the lubricant pressure (P) is above 50 psi, the pressure creates a pushing force on the second spring 306 from the stopper 290 causing the second spring 306 to compress and the stopper 290 to move into the fifth position 329. This opens the bypass line 286 from the supply line 282 directly to the return line 284 and back to the lubricant reservoir 168, in particular the oil storage 172.

Figure 8:
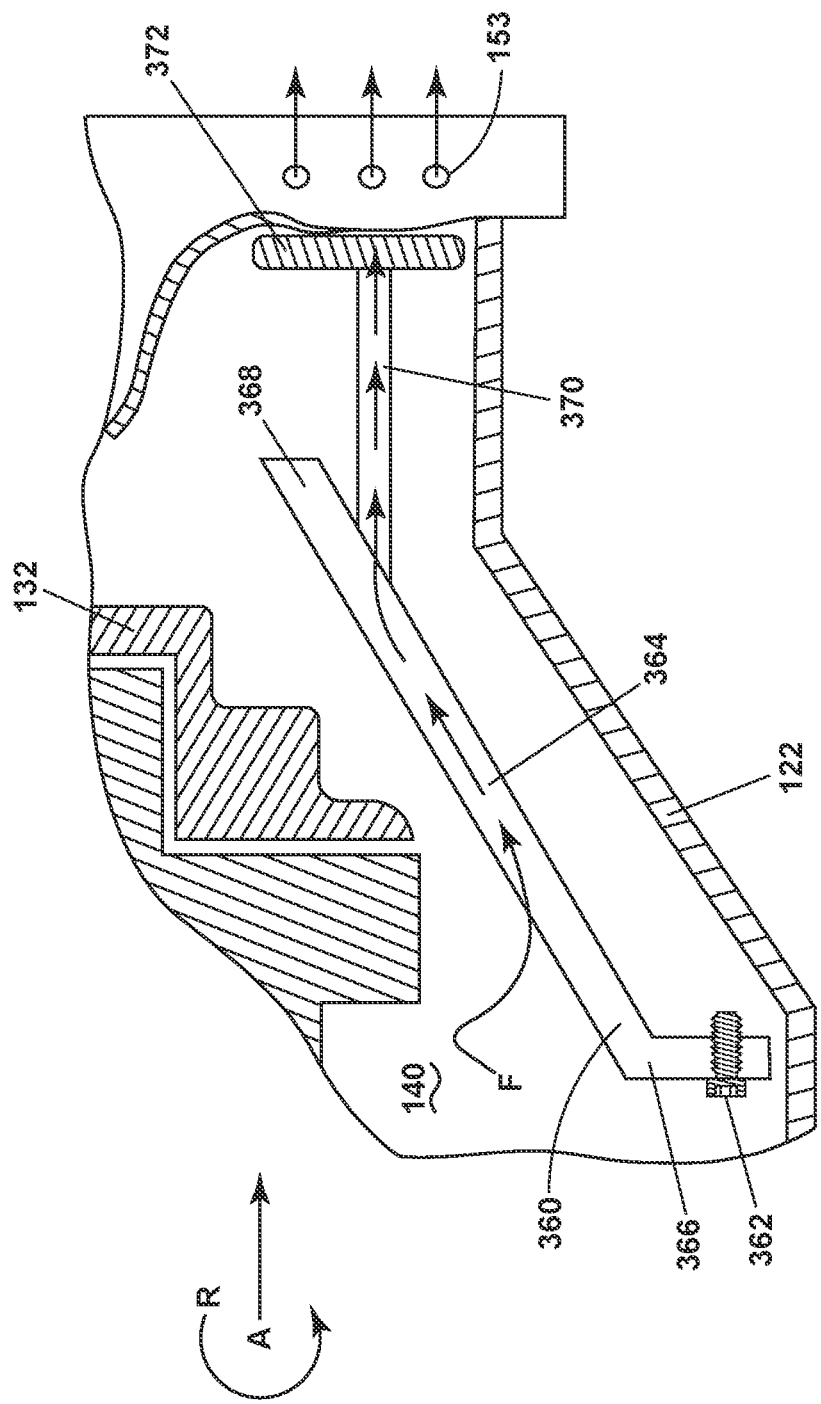
FIG. 8 is an enlarged view of a portion of the air turbine starter from FIG. 2 according to a variation of the air turbine starter with a lubricant diverter.

Turning to FIG. 8, an enlarged view of section VIII from FIG. 2 is illustrated. A lubricant diverter 360 can be located within the drive housing 122 to arrest the lubricant within the housing interior 140. The lubricant diverter 360 can be mounted to the drive housing 122 by any suitable fastener 362. The lubricant diverter 360 can include a diverter body 364 shaped to move the lubricant (L) from a rotary motion (R) to an axial direction (A). The diverter body 364 can extend both axially and circumferentially (into the page) between a first end 366 at the fastener 362 to a second end 368. An outlet passage 370 can extend between the second end 368 and the set of outlets 153. A mesh 372 can be provided at the set of AGB outlets 153 within the drive housing 122. During operation the lubricant diverter 360 enables a translation from the rotary motion (R) to the axial motion (A).

Figure 9:
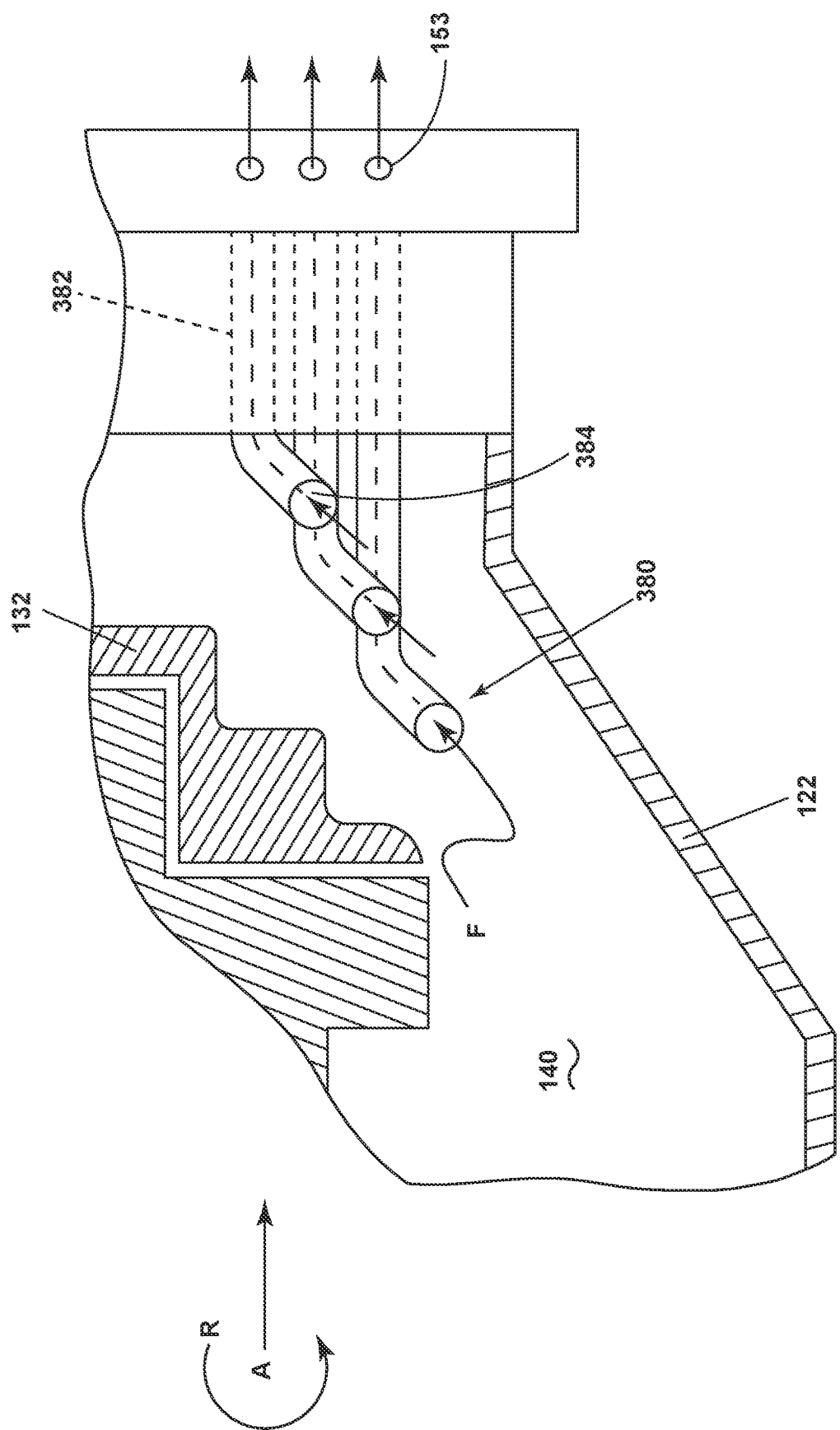
FIG. 9 is an enlarged view of a portion of the air turbine starter from FIG. 2 according to a variation of the air turbine starter with a set of suction inlets.

Turning to FIG. 9, an enlarged view of section VIII from FIG. 2 is illustrated. A set of suction conduits 380 can be located within the drive housing 122 having a hole axis along the rotary motion (R) of the lubricant (L). The set of suction conduits 380 include suction passages 382 extending both axially and circumferentially (into the page) between a suction inlet 384 and the set of outlets 153. During operation the set of suction conduits 380 enables a translation from the rotary motion (R) to the axial motion (A).

Figure 10:
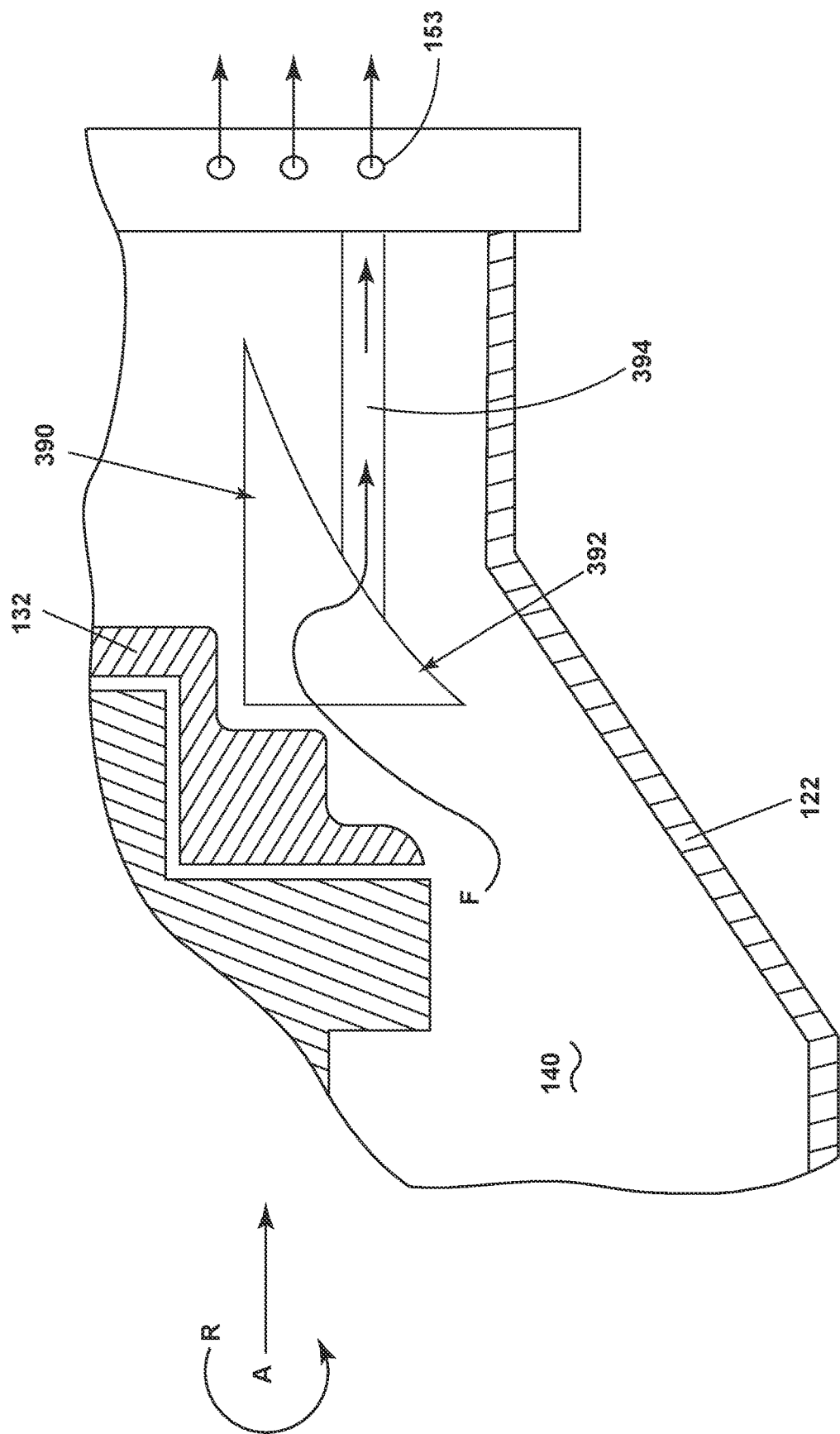
FIG. 10 is an enlarged view of a portion of the air turbine starter FIG. 2 according to a variation of the air turbine starter with a lubricant diverter.

Turning to FIG. 10, an enlarged view of section VIII from FIG. 2 is illustrated. A swirl diverter 390 can be located within the drive housing 122 to arrest the lubricant within the housing interior 140. The swirl diverter 390 can be mounted within the drive housing 122 proximate the driven member 132. The swirl diverter 390 can include a swirl body 392 shaped to move the lubricant (L) from a rotary motion (R) to an axial direction (A). The swirl body 392 can extend both axially and circumferentially (into the page). An outlet passage 394 can extend between the swirl body 392 and the set of outlets 153. During operation the swirl diverter 390 enables a translation from the rotary motion (R) to the axial motion (A).

It should be understood that any of the lubricant diverter 360, the suction conduits 380, or the swirl diverter 390 can be provided in the ATS 100 described herein. It is further contemplated that aspects of each can be combined or provided within the ATS 100 at different locations.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Many other possible embodiments and configurations in addition to that shown in the above figures are contemplated by the present disclosure. Additionally, the design and placement of the various components such as starter, AGB, or components thereof can be rearranged such that a number of different in-line configurations could be realized.

The lubrication recirculation circuit described herein provides a communication back and forth between the AGB and the air turbine starter of lubrication utilized in both areas. Since the lubricant, or in some cases oil pressure, is a function of the AGB shaft speed, the lubricant pressure will increase as the shaft speed increases. This change in pressure causes differentials in the lubricant pressure. Introducing the lubrication recirculation circuit as described herein enables a control of the flow rate of lubricant, for example lubrication oil, to cool the bearing and rotating parts. At the lower pressures described herein, the lubricant will flow to the turbine section only during motoring and cut off at the higher pressures discussed. At those higher pressures, the lubricant will flow to the drive section only during over running. Providing lubrication during extended motoring extends the life of bearing and rotating parts of turbine section.

Benefits associated with the two springs described herein provide selective flow within the air turbine starter. Under normal working conditions the springs activate according to the pressures thereby closing the turbine and drive sections respectively when lubrication is not necessary in either section. In other words, lubrication is provided to the respective locations within the air turbine starter when necessary.

Further, a benefit of providing a pressure valve enables a complete shut off of lubrication to the air turbine starter in case of a housing breach causing the higher stiffness spring to activate. This in turn closes the flow path to the air turbine starter and the lubricant is bypassed to the AGB.

Further, to maintain proper levels of oil within the air turbine starter, the flow set outlets described herein can be coupled to various exemplary diverters. During drive shaft rotation, the lubricant will be in a swirling mode and the lubricant will not direct towards the set of outlets described which are oriented in a perpendicular direction with respect to the swirling motion. Without diverters, the lubricant level within the air turbine starter will increase. The diverters described herein, the lubricant diverter, the set of suction outlets, and the swirl diverter, are provided in a swirling direction for the oil to pass from the swirling or rotary motion to the axial direction and exit the air turbine starter.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or circuits and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An air turbine starter (ATS) for a gas turbine engine having an accessory gear box (AGB) with a lubricant reservoir, the air turbine starter comprising a housing at least partially defining a working air flow path; a turbine section comprising a turbine having a turbine shaft and a plurality of blades circumferentially spaced about the turbine shaft, the plurality of blades at least partially extending into the working air flow path; a drive section having at least one lubricated component, a drive shaft operably coupling the turbine shaft to the AGB; and a lubrication recirculation circuit having a supply line fluidly coupling the lubricant reservoir to the at least one lubricated component, and a return line fluidly coupling the at least one lubricated component to the lubricant reservoir.

The air turbine starter of any preceding clause further comprising a bypass line fluidly coupling the supply line to the return line for bypassing the at least one lubricated component.

The air turbine starter of any preceding clause wherein the bypass line comprises at least one return outlet fluidly coupling the supply line to the return line.

The air turbine starter of any preceding clause further comprising a valve for controlling a flow of lubricant through the lubrication recirculation circuit.

The air turbine starter of any preceding clause wherein the valve is a pressure valve, which is responsive to a lubricant pressure.

The air turbine starter of any preceding clause wherein the at least one return outlet includes a first return outlet opened by the pressure valve when the lubricant pressure is between a low lubricant pressure and a threshold pressure value to define a drive supply position.

The air turbine starter of any preceding clause wherein the supply line is fluidly coupled to the drive section in the drive supply position.

The air turbine starter of any preceding clause wherein the at least one return outlet includes a second return outlet opened by the pressure valve when the lubricant pressure is above a threshold pressure value to define a bypass position.

The air turbine starter of any preceding clause wherein the supply line is fluidly blocked from the drive section and the turbine section in the bypass position.

The air turbine starter of any preceding clause wherein the supply line is fluidly coupled to the turbine section by the pressure valve when the lubricant pressure is between a minimum pressure requirement and a high lubricant pressure to define a turbine supply position.

The air turbine starter of any preceding clause further comprising a pressure valve for controlling a flow of lubricant between the supply line and the at least one lubricated component.

The air turbine starter of any preceding clause wherein the pressure valve is a multiplex control valve which, when a pressure difference between the ATS and the AGB is indicative of a housing breach, the supply line is closed and the bypass line is open, and, when the pressure in the pressure difference is indicative of normal operation of the ATS, the supply line is open.

The air turbine starter of any preceding clause further comprising a pressure valve, which, when a pressure difference between the ATS and the AGB is indicative of a housing breach, the supply line is closed, and, when the pressure difference is indicative of normal operation of the ATS, the supply line is open.

The air turbine starter of any preceding clause, further comprising a first spring and a second spring with a different stiffness value than the first spring, the first spring transposing the pressure valve between a first position and a second position and the second spring transposing the pressure valve between a third position and a fourth position.

A lubrication recirculation circuit comprising a lubricant reservoir located in an accessory gear box (AGB); a housing for an air turbine starter (ATS), the housing defining an interior with at least one lubricated component, a turbine section with a turbine shaft, and a drive section with a drive shaft operably coupled to the turbine shaft located within, an output shaft at least partially disposed within the housing and operably coupling the drive shaft to the AGB; and a supply line fluidly coupling the lubricant reservoir to the at least one lubricated component, and a return line fluidly coupling the at least one lubricated component to the lubricant reservoir.

The lubrication recirculation circuit of any preceding clause, further comprising a bypass line fluidly coupling the supply line to the return line for bypassing the at least one lubricated component.

The lubrication recirculation circuit of any preceding clause wherein the supply line comprises a set of distribution conduits including a turbine conduit fluidly coupled to the turbine section and a drive conduit fluidly coupled to the drive section.

The lubrication recirculation circuit of any preceding clause, further comprising a valve for selectively opening and closing the bypass line, the turbine conduit, and the drive conduit.

The lubrication recirculation circuit of any preceding clause, further comprising a first spring and a second spring with a different stiffness value than the first spring, the first spring transposing the valve between a turbine supply position and a drive supply position and the second spring transposing the valve into a bypass position.

The lubrication recirculation circuit of any preceding clause, further comprising a set of outlets located in the housing and a diverter for moving a flow of lubricant from a rotary motion to an axial direction with the diverter fluidly coupled to the set of outlets.

A lubrication recirculation circuit comprising a housing including at least one opening; a set of distribution conduits having at least one inlet fluidly coupled to the at least one opening; a piston disposed within the housing, movable between a first position and a second position, the piston having at least one thru hole fluidly coupled to the at least one opening when the piston is in the first position; and a stopper disposed within the piston, movable between a third position, a fourth position, and a fifth position, the stopper having at least one outlet fluidly coupled to the at least one thru hole when the stopper is in the third position; a reservoir fluidly coupled to the at least one outlet; a lubrication line extending between the reservoir and the set of distribution conduits, the lubrication line open to a flow of lubricant when the piston is in the first position and closed to a flow of lubricant when the piston is in the second position.

The lubrication recirculation circuit of any preceding clause wherein the at least one opening is multiple openings, the at least one inlet is multiple inlets, the at least one thru hole is multiple thru holes, and the at least one outlet is multiple outlets, wherein a first opening is fluidly coupled to a first inlet, a first outlet, and a first thru hole when the piston is in the first position and the stopper is in the third position, a second opening is fluidly coupled to a second inlet, a second outlet, and a second thru hole when the piston is in the second position and the stopper is in the fourth position.

The lubrication recirculation circuit of any preceding clause wherein a third opening is fluidly coupled to a first return outlet, a third outlet, and a third thru hole when the piston is in the second position and the stopper is in the fourth position and a fourth opening is fluidly coupled a second return outlet when the piston is in the second position and the stopper is in the fifth position.

The lubrication recirculation circuit of any preceding clause wherein the set of distribution conduits is multiple conduits including a turbine conduit extending between the first inlet and a turbine section and a drive conduit extending between the second inlet and a drive section.

The lubrication recirculation circuit of any preceding clause further comprising a return line extending between a first return outlet and the reservoir and a bypass line extending between a second return outlet and the reservoir.

What is claimed is:

1. A lubrication recirculation circuit comprising:
   a housing;
   a distribution chamber provided within the housing;
   a piston disposed within the distribution chamber, the piston movable between a first piston position and a second piston position;
   a stopper movably disposed within the piston and having at least one outlet;
   a reservoir fluidly coupled to the distribution chamber; and a lubrication line fluidly coupling the reservoir to the distribution chamber, the lubrication line further comprising a first conduit and a second conduit each extending from the distribution chamber;
   wherein the first conduit of the lubrication line is open to a flow of lubricant when the piston is in the first piston position, and wherein the second conduit of the lubrication line is open to a flow of lubricant when the piston is in the second piston position; and
   wherein the stopper includes a hollow portion which allows the lubricant to flow through an interior of the stopper.

2. The lubrication recirculation circuit of claim 1, further comprising a pressure valve provided within the distribution chamber, the pressure valve including a valve housing, and wherein the piston and the stopper are positioned within the valve housing.

3. The lubrication recirculation circuit of claim 2, wherein the valve housing further includes a closed end spaced from an open end, with the open end fluidly coupling the distribution chamber to the reservoir.

4. The lubrication recirculation circuit of claim 2, further comprising a set of openings provided in the valve housing.

5. The lubrication recirculation circuit of claim 4, wherein the set of openings further comprise a first opening fluidly coupling the first conduit to the distribution chamber when the piston is in the first piston position, and a second opening fluidly coupling the second conduit to the distribution chamber when the piston is in the second piston position.

6. The lubrication recirculation circuit of claim 5, wherein the piston further comprises a first piston wall defining a piston interior.

7. The lubrication recirculation circuit of claim 6, further comprising a set of thru holes extending through the first piston wall.

8. The lubrication recirculation circuit of claim 7, wherein the set of thru holes further includes a first thru hole fluidly coupling the piston interior to the first conduit through the first opening in the valve housing when the piston is in the first piston position, and wherein the set of thru holes further includes a second thru hole fluidly coupling the piston interior to the second conduit through the second opening in the valve housing when the piston is in the second piston position.

9. The lubrication recirculation circuit of claim 6, further comprising a second piston wall extending into the piston interior perpendicular to the first piston wall and at least partially dividing the piston interior into a first chamber and a second chamber.

10. The lubrication recirculation circuit of claim 9, further comprising a first spring positioned within the first chamber and a second spring positioned within the second chamber.

11. The lubrication recirculation circuit of claim 10, wherein the first spring has a different spring constant than the second spring.

12. The lubrication recirculation circuit of claim 10, wherein the stopper further includes a nose extending interior of the first spring and the second spring.

13. The lubrication recirculation circuit of claim 10, wherein the stopper is movable between a first stopper position, a second stopper position, and a third stopper position, and wherein a spring constant for the second spring enables the stopper to position at the third stopper position between the first stopper position and the second stopper position.

14. The lubrication recirculation circuit of claim 13, further comprising a bypass line and a return line, and wherein the bypass line connects the lubrication line to the return line when the stopper is at the third stopper position.

15. The lubrication recirculation circuit of claim 1, wherein the stopper defines the hollow portion extending between a first end and a second end.

16. The lubrication recirculation circuit of claim 15, wherein the stopper further includes a first stopper outlet fluidly coupling the hollow portion to the first conduit when the piston is in the first piston position, and a second stopper outlet fluidly coupling the hollow portion to the second conduit when the piston is in the second piston position.

17. The lubrication recirculation circuit of claim 1, wherein the stopper is movable between a first stopper position and a second stopper position when the piston moves between the first piston position and the second piston position, wherein the stopper positions at the first stopper position when the piston is in the first piston position, and wherein the stopper positions at the second stopper position when the piston is in the second piston position.

18. A lubrication recirculation circuit comprising:
    a housing;
    a distribution chamber provided within the housing;
    a piston disposed within the distribution chamber and defining a piston interior, the piston movable between a first piston position and a second piston position;
    a stopper disposed within the piston movable between a first stopper position when the piston moves to the first piston position and a second stopper position when the piston moves to the second piston position; and
    a lubrication line including a first conduit and a second conduit each extending from the distribution chamber;
    wherein the first conduit of the lubrication line is open to a flow of lubricant from the distribution chamber when the piston is in the first piston position, and wherein the second conduit of the lubrication line is open to a flow of lubricant when the piston is in the second piston position.

19. The lubrication recirculation circuit of claim 18, wherein the piston further comprises a piston wall at least partially dividing the piston interior into a first chamber and a second chamber, and wherein a first spring is provided in the first chamber and a second spring is provided in the second chamber.

20. The lubrication recirculation circuit of claim 19, wherein the stopper is further movable to a third stopper position, wherein a spring constant for the second spring enables the stopper to position at the third stopper position between the first stopper position and the second stopper position.

* * * * *